(12) United States Patent
Tavares Miranda

(10) Patent No.: US 11,339,865 B2
(45) Date of Patent: May 24, 2022

(54) NARROW—WIDE TEETH CHAINRING

(71) Applicant: MIRANDA & IRMAO, LDA, Agueda (PT)

(72) Inventor: Joao Filipe Tavares Miranda, Agueda (PT)

(73) Assignee: MIRANDA & IRMAO, LDA, Agueda (PT)

( * ) Notice: Subject to any disclaimer, the term of this patent is extended or adjusted under 35 U.S.C. 154(b) by 243 days.

(21) Appl. No.: 16/611,597

(22) PCT Filed: May 12, 2017

(86) PCT No.: PCT/EP2017/061507
§ 371 (c)(1),
(2) Date: Nov. 7, 2019

(87) PCT Pub. No.: WO2018/206123
PCT Pub. Date: Nov. 15, 2018

(65) Prior Publication Data
US 2020/0156736 A1    May 21, 2020

(51) Int. Cl.
*F16H 55/30*    (2006.01)
*B62M 9/06*    (2006.01)
(Continued)

(52) U.S. Cl.
CPC ............... *F16H 55/30* (2013.01); *B62M 9/06* (2013.01); *B62M 9/105* (2013.01); *B62M 9/131* (2013.01)

(58) Field of Classification Search
CPC .......... F16H 55/30; F16H 7/06; F16H 55/303; B62M 9/10; B62M 9/105
(Continued)

(56) References Cited

U.S. PATENT DOCUMENTS 4,174,642 A * 11/1979 Martin ................ F16H 55/30
474/152
6,203,462 B1 * 3/2001 Takamori ............ B62M 9/02
474/156
(Continued)

FOREIGN PATENT DOCUMENTS

CN    104229057    12/2014
CN    106564558    4/2017
(Continued)

OTHER PUBLICATIONS

Office Action for Corresponding Chinese Application No. 2017800906639, dated Aug. 17, 2020, 5 Pages, English translation 4 Pages.
(Continued)

*Primary Examiner* — Henry Y Liu
(74) *Attorney, Agent, or Firm* — Lucas & Mercanti, LLP

(57) ABSTRACT

A sprocket for engagement with a drive chain has a plurality of teeth extending radially from a periphery of the sprocket, including a first and a second group of teeth; the teeth of the first group and the second group are alternately arranged so that each tooth of the first group is followed by a tooth of the second group, and vice versa; each tooth of the first group having a first maximum width, each tooth of the second group having a second maximum width which is larger than the first maximum width; each tooth of the second group has a protrusion on at least one lateral face of the tooth; the outer lateral face of the protrusion extends over a first portion of the lateral face of each tooth of the second group, the length being 50% of the length of the respective tooth or less.

8 Claims, 3 Drawing Sheets

(51) Int. Cl.
  *B62M 9/10*   (2006.01)
  *B62M 9/131*  (2010.01)

(58) Field of Classification Search
  USPC .................................................. 474/152, 156
  See application file for complete search history.

(56) References Cited

U.S. PATENT DOCUMENTS

| | | | |
|---|---|---|---|
| 8,506,436 B2 | 8/2013 | Wickiffe et al. | |
| 8,888,631 B2 | 11/2014 | Morita | |
| 9,086,138 B1* | 7/2015 | Emura | F16H 7/06 |
| 9,150,277 B2* | 10/2015 | Emura | B62M 3/00 |
| 9,291,250 B2* | 3/2016 | Reiter | F16H 55/303 |
| 9,394,986 B2* | 7/2016 | Pfeiffer | B62M 9/105 |
| 9,394,987 B2* | 7/2016 | Pfeiffer | F16H 55/30 |
| 9,540,070 B2* | 1/2017 | Watarai | B62M 9/02 |
| 9,581,229 B2* | 2/2017 | Pfeiffer | F16H 55/30 |
| 9,581,230 B2* | 2/2017 | Pfeiffer | F16H 55/30 |
| 10,247,291 B2* | 4/2019 | Akanishi | B62M 9/00 |
| 10,359,106 B2* | 7/2019 | Akanishi | F16H 55/30 |
| 10,378,637 B2* | 8/2019 | Ooishi | B62M 9/10 |
| 10,577,050 B2* | 3/2020 | Akanishi | B62M 9/10 |
| 10,578,201 B2* | 3/2020 | Reiter | B62M 9/00 |
| 2002/0098934 A1* | 7/2002 | Wigsten | F16H 55/30 474/212 |
| 2006/0128511 A1 | 6/2006 | Oishi | |
| 2007/0054768 A1* | 3/2007 | Miyazawa | F16H 55/30 474/152 |
| 2013/0109519 A1* | 5/2013 | Morita | F16H 55/30 474/148 |
| 2013/0139642 A1* | 6/2013 | Reiter | B62M 9/08 74/594.2 |
| 2013/0184110 A1* | 7/2013 | Reiter | F16H 55/30 474/152 |
| 2014/0338494 A1* | 11/2014 | Sugimoto | F16H 55/30 74/594.2 |
| 2014/0364259 A1* | 12/2014 | Reiter | F16H 55/30 474/155 |
| 2015/0198231 A1* | 7/2015 | Emura | F16H 7/06 474/156 |
| 2015/0226305 A1* | 8/2015 | Pfeiffer | B62M 9/105 474/152 |
| 2015/0239528 A1* | 8/2015 | Barefoot | B62M 9/00 474/152 |
| 2015/0285362 A1* | 10/2015 | Pfeiffer | B62M 9/10 474/152 |
| 2015/0285363 A1* | 10/2015 | Pfeiffer | F16H 55/30 474/152 |
| 2015/0285364 A1* | 10/2015 | Pfeiffer | B62M 9/10 474/152 |
| 2015/0337943 A1* | 11/2015 | Sugimoto | B62M 9/02 474/152 |
| 2015/0362057 A1* | 12/2015 | Wesling | B62M 9/10 474/152 |
| 2016/0238122 A1* | 8/2016 | Medaglia | B62M 9/00 |
| 2016/0280325 A1* | 9/2016 | Watarai | B62M 9/105 |
| 2017/0101159 A1* | 4/2017 | Watarai | F16H 55/30 |
| 2017/0234418 A1 | 8/2017 | Barefoot et al. | |
| 2017/0276229 A1 | 9/2017 | Reiter et al. | |
| 2017/0283005 A1 | 10/2017 | Inoue et al. | |
| 2019/0315434 A1 | 10/2019 | Watarai et al. | |

FOREIGN PATENT DOCUMENTS

| | | |
|---|---|---|
| DE | 202007010066 U1 | 9/2007 |
| EP | 2602176 A1 | 6/2013 |
| EP | 2810864 A1 | 12/2014 |
| EP | 3072799 A1 | 9/2016 |
| EP | 3072800 A1 | 9/2016 |
| EP | 3072801 A1 | 9/2016 |
| EP | 3072802 A1 | 9/2016 |
| EP | 3072803 A1 | 9/2016 |
| EP | 3075644 A1 | 10/2016 |
| WO | 03095867 A1 | 11/2003 |

OTHER PUBLICATIONS

Extended European Search Report for corresponding European Application No. 21153252.8-1009 dated May 4, 2021, 8 Pages.
International Search Report and Written Opinion for Corresponding International Application No. PCT/EP2017/061507 (8 Pages) (dated Feb. 13, 2018).

* cited by examiner

NARROW—WIDE TEETH CHAINRING

CROSS REFERENCE TO RELATED APPLICATION

This Application is a 371 of PCT/EP2017/061507 filed on May 12, 2017, which is incorporated herein by reference.

TECHNICAL FIELD

The present invention relates to a sprocket for engagement with a drive chain and more particularly to a chainring for a bicycle.

The sprocket comprises:
a plurality of teeth extending radially from a periphery of the sprocket;
each tooth extending over a given circumferential length of the sprocket;
each tooth having a front flank contacting a roller of the drive chain in regular drive operation and a rear flank;
the plurality of teeth including a first and a second group of teeth, wherein the teeth of the first group and the second group are alternately arranged so that each tooth of the first tooth group is followed by a tooth of the second group, and vice versa;
each tooth of the first group of teeth having a first maximum width;
each tooth of the second group of teeth having a second maximum width which is larger than the first maximum width, wherein each tooth of the second group of teeth has a protrusion on at least one lateral face of the tooth.

Sprockets and in particular chainrings with alternating narrow and wide teeth have been proposed for the purpose of improving the guidance of the chain on the teeth of the sprocket. The drive chain of a vehicle like a bicycle comprises a succession of rollers connected by chain links. Each chain link is composed of a pair of link plates fixed to the axial ends of the rollers. The ends of two link plates are fixed to each axial end of a roller by means of a pin. A pair of inner link plates contacts the roller and a pair of outer link plates contacts the inner link plates. Consequently, due to the alternating succession of inner link plates and outer link plates, the lateral distance between the link plates of a chain varies in an alternating manner. The sections of the clear spaces between the inner link plates are of rectangular shape, the front end and rear end being defined by the rollers to which the link plates are attached. The sections of the clear spaces between the outer link plates have the shape of a cross or a + with smaller portions adjacent to the rollers defined by the ends of the inner link plates and a wider portion in the middle. The width of the wider portion corresponds to the distance between the outer link plates.

It has been found that the use of alternating narrow and wide teeth on a chainring provides for better guidance and engagement of the chain. This is of particular importance when a single chainring driven by cranks of a bicycle is combined with multiple sprockets fixed to the rear wheel of the bicycle in order to provide different gears. Moreover, shocks and vibrations that occur while riding on difficult terrain risk to disengage the chain from the teeth of the sprockets. Teeth that have a width closely matching the width of the spaces between the chain links have proven to be less likely to disengage due to shock or vibrations.

BACKGROUND ART

In the recent past, a number of chainrings with alternating narrow and wide teeth have been proposed for the purpose of improving the chain drive of bicycles.

US 2002/0098934 A1 and WO 03/0095867 A1 describe early versions of such chainrings. A series of patent applications based on European patent application EP 2 602 176 A1 defines specific features of such chainrings, i.e. divisional applications EP 3 075 644 A1, EP 3 072 799 A1, EP 3 072 800 A1, EP 3 072 801 A1, EP 3 072 802 A1, EP 3 072 803 A1. The wide teeth with the protrusions of these patent applications basically have a cross shaped section that matches the cross shaped section of the respective link space in which they are to be accommodated.

SUMMARY OF THE INVENTION

It is an object of the invention to provide a sprocket with alternating narrow and wide teeth that has a low weight and remains functional in a muddy environment with a soiled chain.

This object is attained in that the protrusion extends over a first portion of the lateral face of each tooth of the second group of teeth, the length of the first portion being 50% or less than the length of the respective tooth.

In practice, each tooth of the second group of teeth may have a protrusion on each of the two lateral faces of the tooth. The lateral exterior face of the protrusion of the wide teeth only extends over a first portion of the lateral face of the respective tooth which equals to half the tooth length or less. The remaining part of the lateral face of the respective tooth is free of any protrusions. As a result, the wide teeth are guided between the outer chain link plates with little play but only over a limited portion of the entire length of the respective tooth. The absence of a protrusion in the remaining part of the tooth reduces the weight of the tooth and the surface area of the tooth. Consequently, the tooth can penetrate the link spaces between the outer chain link plates more easily even if the link spaces are soiled or clogged up by dust or dirt. The wide teeth with the short protrusions will be subject to a lower resistance against entering the link space due to the fact that they fill up only a fraction of the link space. Dust and dirt may be compressed into the areas of the link space which are not occupied by material of the wide teeth. Consequently, the wide teeth provide the same advantageous lateral guidance as the known teeth with protrusions extending over the entire lateral face while increasing the functionality of the chain drive in a soiled environment. At the same time, the noise of the wide teeth engaging the chain is reduced with respect to a chain comprising regular wide teeth with longer protrusions.

In practice, the protrusion may be located adjacent to the front flank of the wide teeth while the portion of these teeth adjacent to the rear flank is free of protrusions. As a result, the wide teeth have the shape of the letter T with a front portion contacting the roller of the drive chain that has a large width due to the lateral protrusion, preferably on each side, and a rear portion having a small width which basically corresponds to the distance between the inner chain links.

This T shape of the wide teeth provides excellent lateral guidance between the outer chain link plates while requiring less material than the known wide teeth with protrusions extending generally over the entire lateral face of the tooth. The wide front portion of the tooth that contacts the roller of the chain is subject to a reduced tensile stress due to the increased material thickness. The fact that the protrusions only extend over the front portion of the lateral faces improves the function of the sprocket when used off-road. If the link spaces are soiled or clogged up by dust or dirt, the T-shaped wide teeth will be subject to a lower resistance against entering the link space due to the fact that they fill up only a fraction of the link space. Dust and dirt may be compressed into the areas of the link space which are not occupied by material of the wide teeth. Consequently, the wide teeth provide the same advantageous lateral guidance as the known teeth with protrusions extending over the entire lateral face while increasing the functionality of the chain drive in a soiled environment.

In practice, at least the front edges of each tooth of the second group of teeth are chamfered. The chamfer avoids contact with the sections of the inner chain link plates which extend into the link space between the outer chain link plates.

In practice, the rear edges of each tooth may also be chamfered. In case of a T-shaped tooth, the extension of the chamfer of the front edges of each tooth of the second group of teeth in the circumferential direction may be between 1.5 and 2 times the extension of the chamfer of the rear edges of the same tooth. In practice, the chamfer on the rear edges may be at an angle of 45° with respect to the circumferential direction of the sprocket and measure 0.5 mm in length and width. The chamfer on the front edges may be at an angle of approx. 37° with respect to the circumferential direction of the sprocket and measure 1 mm in length and 0.75 mm in width. The chamfer should be chosen such that there is no physical contact between the teeth and the elements of the chain when the roller of the chain is accommodated in the radius between two consecutive teeth. The chamfer may be limited to the lower area of the tooth edges, i.e. the circular area between two teeth.

In practice, each protrusion is chamfered or rounded towards the tooth tip. The tooth tip of the narrow teeth may be chamfered or rounded so that it has a smaller width at the radial end of the tooth. This enables the tooth to securely engage in the link space even if the chain may not be perfectly aligned with the center plane of the sprocket depending on the selected gear. In the area of these rounded or chamfered tooth tips edge chamfers on the front and rear edges of the teeth may be omitted.

In practice, each protrusion may extend from the tip of the respective tooth to the level of the circular area between two teeth. It is to be noted that the area between two teeth does not exactly follow a circular shape but may have rounded areas with different radii in order to provide for an optimum engagement of the chain rollers in the space or circular area between two consecutive teeth. In a practical embodiment of the T-shaped tooth, the protrusion extends on both lateral sides from the center of the tip of the lateral face of the tooth down to a tangent line to the circular area between two teeth which extends at an angle of 105° to the center line of the tooth. This way, the protrusion causes the desired lateral guidance and stability of the front portion of the tooth while avoiding excessive weight and occupation of the link space between the outer link plates.

In an alternative embodiment, the lateral protrusions of the teeth may be located adjacent to the rear flank of each tooth. In this case, the narrow part of the teeth contacts the adjacent roller of the chain when driving the bicycle.

In a further alternative embodiment, the protrusion may be located in the middle between the front flank and the rear flank of each tooth of the wide teeth. In this case, the tooth has the shape of a cross with the lateral, large portions of the cross providing guidance of the tooth between the outer chain link plates.

In a further embodiment, the protrusion on the first lateral face of each tooth of the wide teeth may be located at a different location than the protrusion on the second lateral face of the respective tooth. The overall width of this tooth remains approximately the same and provides the desired good guidance between the outer chain link plates.

BRIEF DESCRIPTION OF DRAWINGS

The features and advantages of the invention will be more fully understood from the following description of one or more embodiments, in conjunction with the accompanying drawings, in which:

FIGS. 2 to 4 show a top section of a sprocket, wherein FIGS. 3 and 4 show identical side views of the sprocket and FIG. 2 depicts the sections of the teeth of the sprocket of FIG. 3 cut along line B-B which follows the lines connecting the axes of rollers of a chain engaging the sprocket.

DESCRIPTION OF EMBODIMENTS

Figure 1:
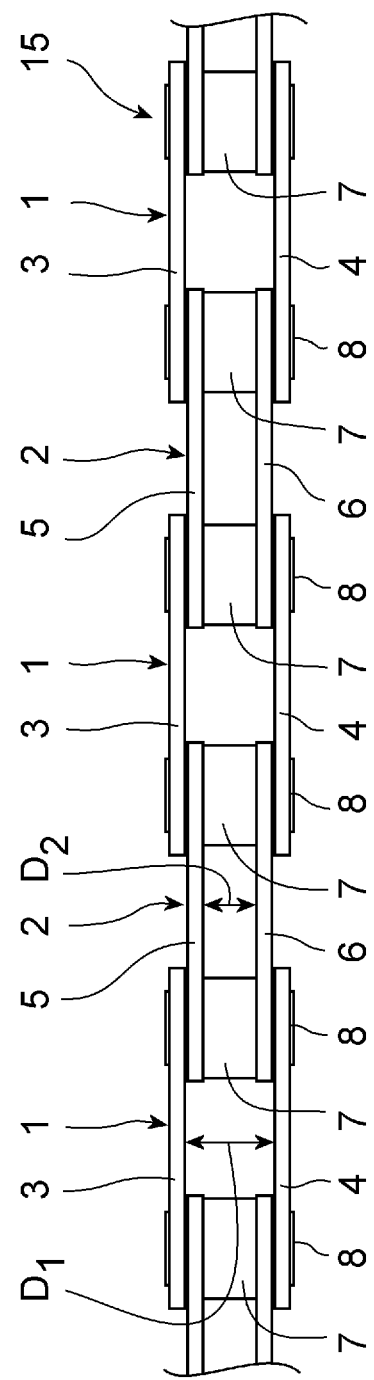
FIG. 1 shows a schematic view of a drive chain of a bicycle.

FIG. 1 shows a top view of a stretched roller chain as conventionally used for driving a bicycle or an e-bike. The drive chain is composed of a succession of outer chain links 1 followed by inner chain links 2. Each outer chain link 1 is composed of two outer link plates 3 and 4. The inner faces of the outer link plates 3 and 4 contact the outer faces of inner link plates 5 and 6, which form the inner chain link 2. The inner faces of the inner link plates 5 and 6 contact a roller 7 at each end of the inner chain links 5 and 6. A pin 8 extends through holes in the end sections of the outer link plates 3, 4, and inner link plates 5, 6, as well as through the roller 7. The ends of the pins 8 are deformed in order to securely fix the link plates 3-6 to the rollers 7. It can be seen in FIG. 1 that the drive chain has a succession of link spaces with a great width $D_1$ between the outer link plates 3, 4, and link spaces with a smaller width $D_2$ between the inner link plates 5, 6.

Figure 2:
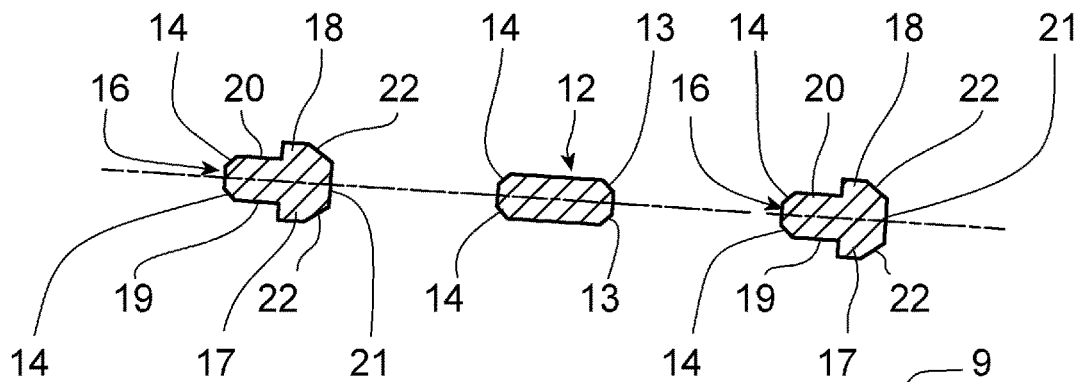
Figure 3:
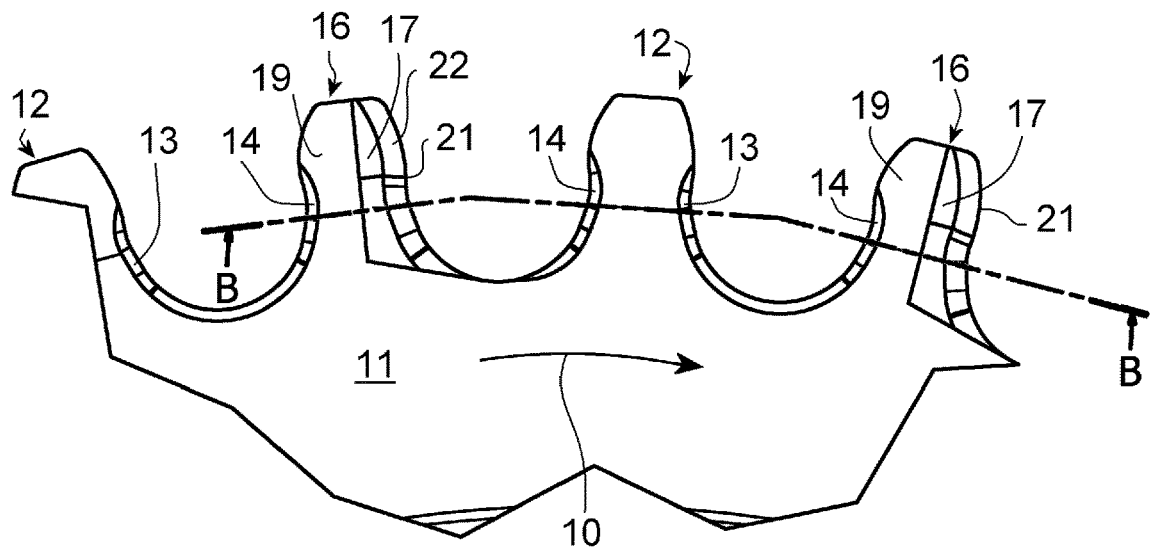
Figure 4:
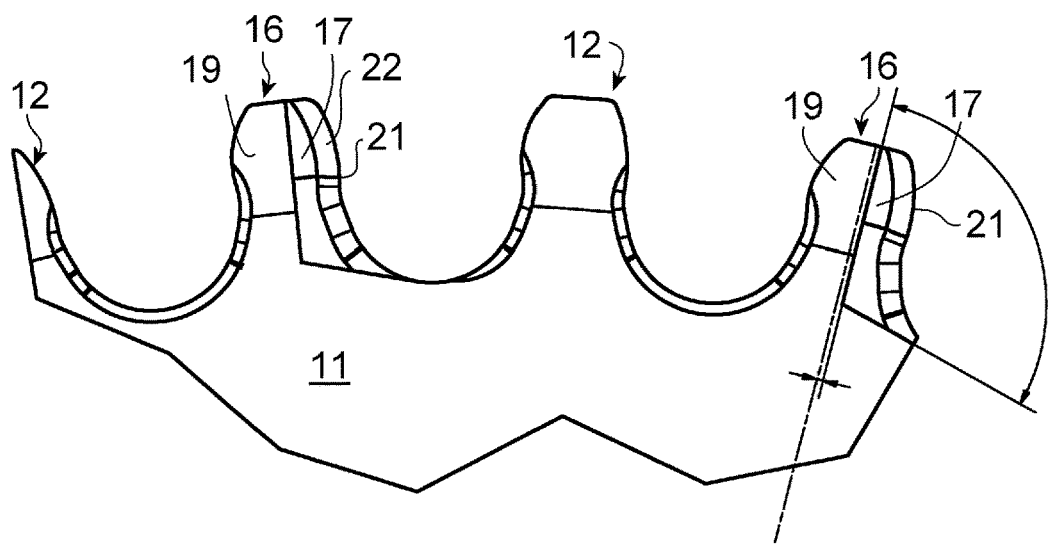

FIGS. 2 to 4 explain the structure of the new sprocket described herein. The sprocket is preferably a single chainring that may be fixed to a crank set of a bicycle. The arrows 9 and 10 in FIGS. 2 and 3 indicate the direction of rotation during regular drive operation of the sprocket 11 when driven by the crank in order to move the bicycle forward. The head of each of the arrows 9 and 10 indicates the forward direction of the teeth on the upper part of the sprocket 11 shown in FIGS. 3 and 4. The front flank of the teeth contacts the rollers 7 of the chain 15 during such drive operation and is located on the right side of each tooth shown in FIGS. 2, 3 and 4. FIG. 2 shows sectional views of the two different varieties of teeth of the sprocket 11 cut along the line B-B in FIG. 3. The line B-B is defined by straight lines connecting the axes of the two rollers of a chain link accommodated by the spaces between the teeth of the sprocket.

The sprocket 11 has two different kinds of teeth 12, 16 which alternate. The first group of teeth are narrow teeth 12 that have a small width and a basically rectangular section in a plane perpendicular to this radial center line of each tooth 12. The tip of each narrow tooth 12 is chamfered or rounded so that the width of the narrow tooth 12 decreases in the direction towards the tip of the tooth 12. The narrow teeth 12 have a front flank on the right side contacting the roller in regular drive operation and a rear flank on the left side in the drawings. Both the front flank and the rear flank are provided with a chamfer 13, 14, in order to avoid physical contact with the inner chain links 5, 6 of the chain 15 and to provide a gap between the inner chain links 5,6 and the flanks for easy penetration of the teeth. A wide tooth 16 is arranged between each pair of narrow teeth 12. The wide tooth 16 has a protrusion 17, 18 on each lateral face 19, 20. The rear portions of the lateral faces 19, 20 of the wide teeth 16 are plane. The protrusion 17, 18, basically extends over the portion of the tooth adjacent the front flank 21 of the wide tooth 16. The protrusion 17,18 generally covers the front half of the lateral face 19, 20 of the wide tooth 16. As can be seen in FIG. 4, the protrusion ends a short distance of approximately 0.3 millimeters from the centerline of the wide tooth 16.

In the direction towards the center of the sprocket 11, the protrusion 17,18 reaches a straight line tangent to the radius of the space between the protrusion 17, 18 and the adjacent narrow tooth 12. The angle between the bottom edge of the protrusion 17 visible on the right-hand side of FIG. 4 and the central edge of the protrusion 17 is approximately 105°.

As can be seen in FIGS. 2 and 4, the wide tooth 16 has a chamfer 22 at the edges of each of the protrusions 17, 18, facing the roller 7 of the chain 15. Again, this chamfer 22 avoids physical contact between lateral parts of the chain 15 and the protrusions 17, 18. The chamfer 22 at each of the front edges of the wide tooth 16 extends over 1 mm in the circumferential direction of the sprocket 11 and over 0.75 mm in the lateral direction. The rear chamfer 14 on the edges of each wide tooth 16 corresponds to the rear chamfer 14 on the edges of each narrow tooth 12 and has a lateral and circumferential extension of 0.5 mm.

Figure 5:
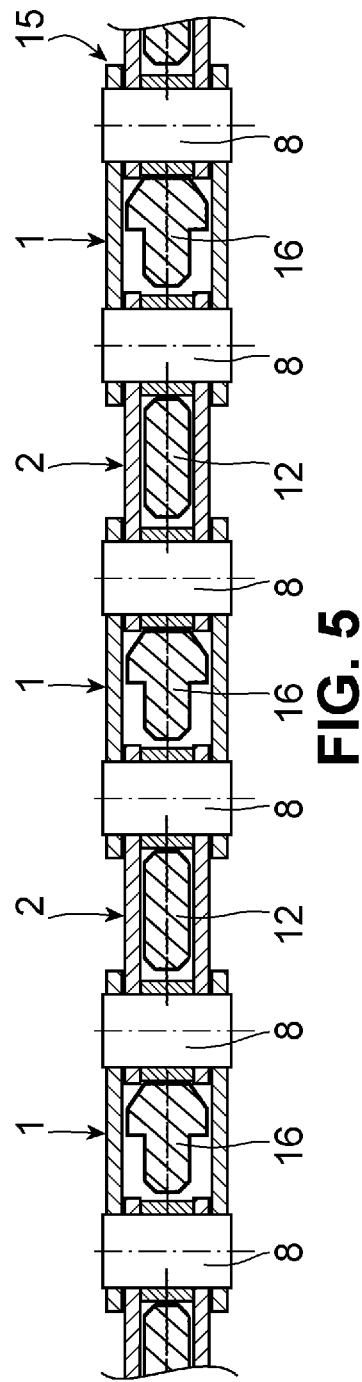
FIG. 5 shows a sectional view of the chain of FIG. 1 with the engaged teeth of the sprocket of FIGS. 2 to 4.

FIG. 5 shows the engagement of the teeth 12 and 16 of the sprocket 11 in the link spaces of the chain 15. FIG. 5 is a sectional view of the chain 15 and the sprocket taken along straight lines extending between the axes of the rollers 7 or pins 8 of the chain 15. It can be seen that the wide teeth 12 have a somewhat T-shaped form. The wide part only extends over the front portion of the wide teeth 16. The rear portion of the wide teeth 16 has basically the same width as the narrow teeth 12. The extended width of the wide teeth 16 provides for good guidance of each tooth in the chain link spaces between the outer link plates 3, 4. At the same time, the wide tooth 16 does not occupy the entire link space. In case of a clogging of the link space, the tooth can more easily enter the link space compressing any dust or soil into the free spaces. Nevertheless, the front part of the wide tooth 16 has an increased stability and provides the necessary lateral guidance for securely engaging with the chain 15.

Figure 6:
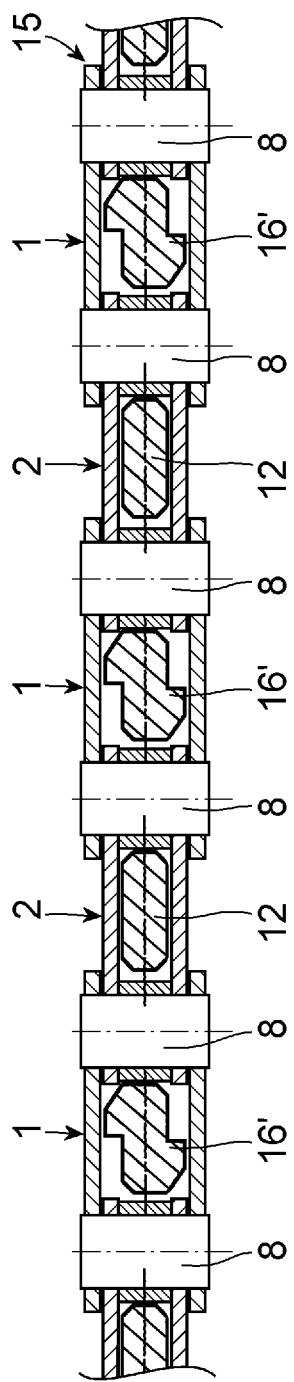
FIG. 6 shows a sectional view of the chain of FIG. 1 with the engaged teeth of a first alternative embodiment of a sprocket.
Figure 7:
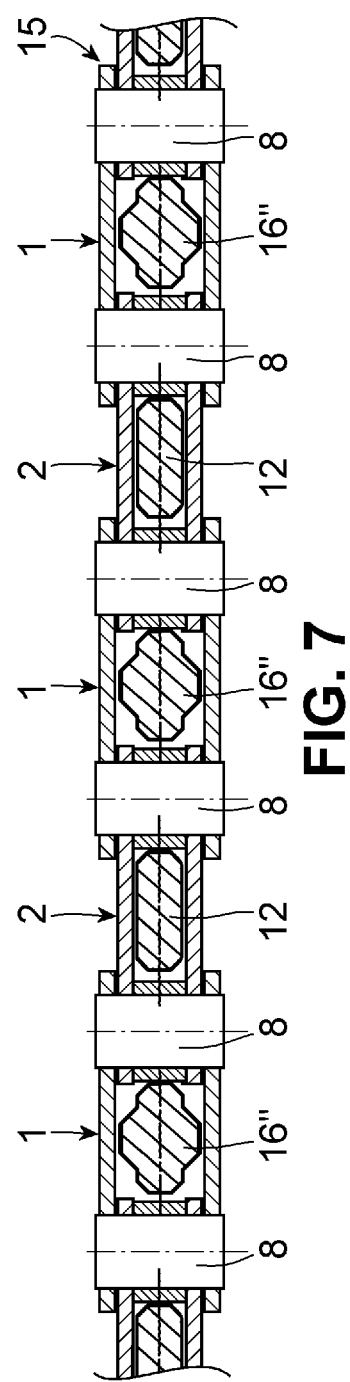
FIG. 7 shows a sectional view of the chain of FIG. 1 with the engaged teeth of a second alternative embodiment of a sprocket.

FIGS. 6 and 7 show identical views of the chain 15 and the narrow teeth 12 and wide teeth 16', 16" of different embodiments of the sprocket. Identical parts are marked with the identical reference numbers as in FIGS. 1-5. In FIG. 6, each wide tooth 16' has a protrusion adjacent the front flank on the left lateral surface and a protrusion adjacent the real flank on the right lateral surface. As a further alternative, the protrusions may adjacent to the rear flanks of the tooth on both lateral surfaces. FIG. 7 shows a further alternative of the shape of the wide tooth 16" with lateral protrusions in the middle of the two lateral surfaces of each wide tooth 16". In all embodiments, the longitudinal extension of the outer lateral face of the protrusion equals less than half of the longitudinal extension of the tooth itself reducing the sectional area of the wide teeth while maintaining good lateral guidance.

LIST OF REFERENCE NUMBERS

1 outer chain link
2 inner chain link
3 outer link plate
4 outer link plate
5 inner link plate
6 inner link plate
7 roller
8 pin
9 direction of rotation
10 direction of rotation
11 sprocket
12 narrow tooth
13 chamfer
14 chamfer
15 chain
16 wide tooth
16' wide tooth
16" wide tooth
17 protrusion
18 protrusion
19 lateral face
20 lateral face
21 front flank
22 chamfer
$D_1$ great width
$D_2$ smaller width

The invention claimed is:

1. A sprocket for engagement with a drive chain, comprising:
    a plurality of teeth extending radially from a periphery of the sprocket;
    each tooth of the plurality of teeth extending over a given circumferential length of the sprocket;
    each tooth of the plurality of teeth having a front flank contacting a roller of the drive chain in regular drive operation and a rear flank;
    the plurality of teeth including a first group of teeth and a second group of teeth, wherein the teeth of the first group and the second group are alternately arranged so that each tooth of the first group of teeth is followed by a tooth of the second group of teeth, and vice versa;
    each tooth of the first group of teeth having a first maximum width;
    each tooth of the plurality of teeth of the second group of teeth having a second maximum width which is larger than the first maximum width, wherein each tooth of the plurality of teeth of the second group of teeth has a protrusion on at least one lateral face of the tooth;
    wherein an outer lateral face of the protrusion extends over a first portion of the at least one lateral face of each tooth of the plurality of teeth of the second group of teeth, wherein the length of the first portion is 50% of the length of the respective tooth of the plurality of teeth or less and
    wherein the protrusion is located adjacent to the front flank of each tooth of the plurality of teeth of the second group of teeth, wherein a width of the respective tooth adjacent to the rear flank is equal to the width of each tooth of the first group of teeth.

2. The sprocket of claim 1 comprising two lateral faces, wherein each tooth of the plurality of teeth of the second group of teeth has a protrusion on each of the two lateral faces of each tooth of the plurality of teeth.

3. The sprocket of claim 1, wherein each tooth of the second group of teeth comprises front edges and the front edges are chamfered.

4. The sprocket of claim 1, wherein each tooth of the plurality of teeth comprises rear edges and the rear edges of each tooth are chamfered.

5. The sprocket of claim 3, wherein the extension of the chamfer of each of the front edges of each tooth of the plurality of teeth of the second group of teeth in the circumferential direction is between 1.5 and 2 times the extension of the chamfer of each of the rear edges of the same tooth.

6. The sprocket of claim 1, wherein each protrusion is chamfered or rounded towards the tooth tip.

7. The sprocket of claim 1, wherein each protrusion extends from the tip of the respective tooth to the bottom of the space between two adjacent teeth of the sprocket.

8. The sprocket of claim 4, wherein the extension of the chamfer of each of the front edges of each tooth of the plurality of teeth of the second group of teeth in the circumferential direction is between 1.5 and 2 times the extension of the chamfer of each of the rear edges of the same tooth.

* * * * *